Figure 1:
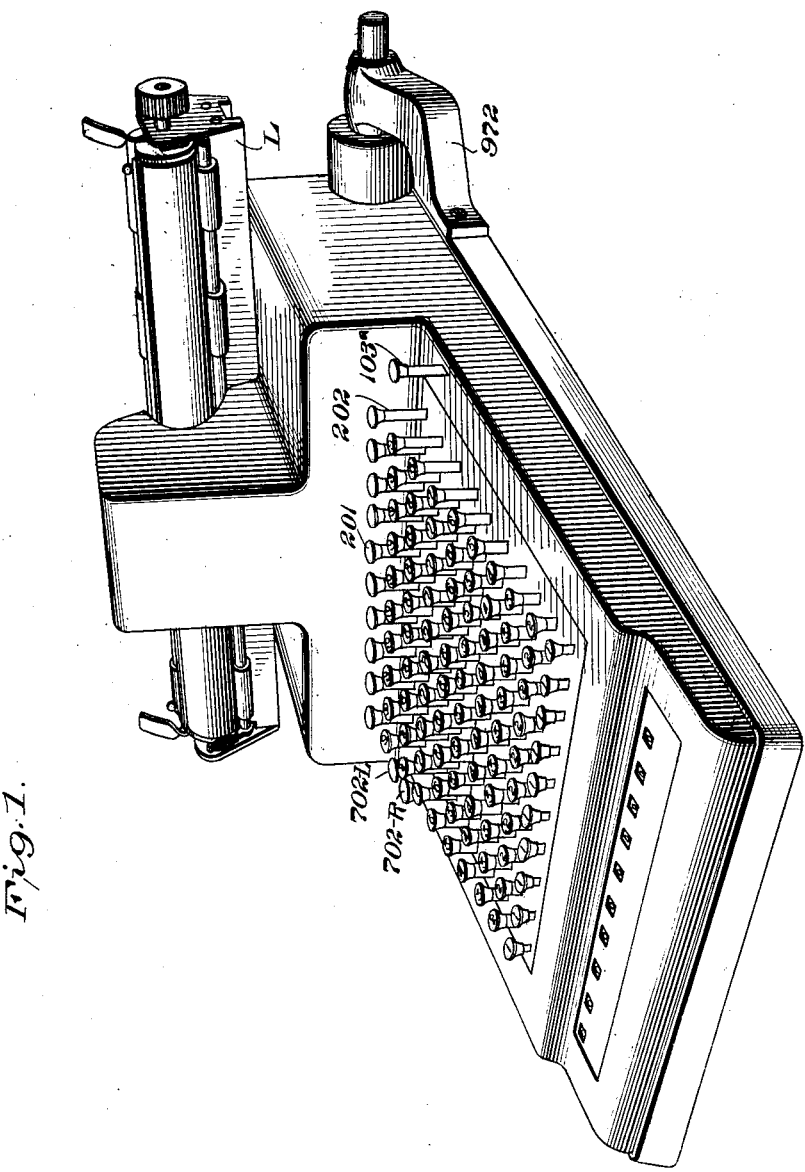

W. H. PIKE, Jr.
ADDING AND RECORDING MACHINE.
APPLICATION FILED MAY 25, 1904.

1,049,911.

Patented Jan. 7, 1913.
13 SHEETS—SHEET 1.

Witnesses:
J. Adolph Bishop
C. D. Brown.

Inventor.
William H. Pike Jr.
by Foster Freeman Watson & Coit
Attorneys.

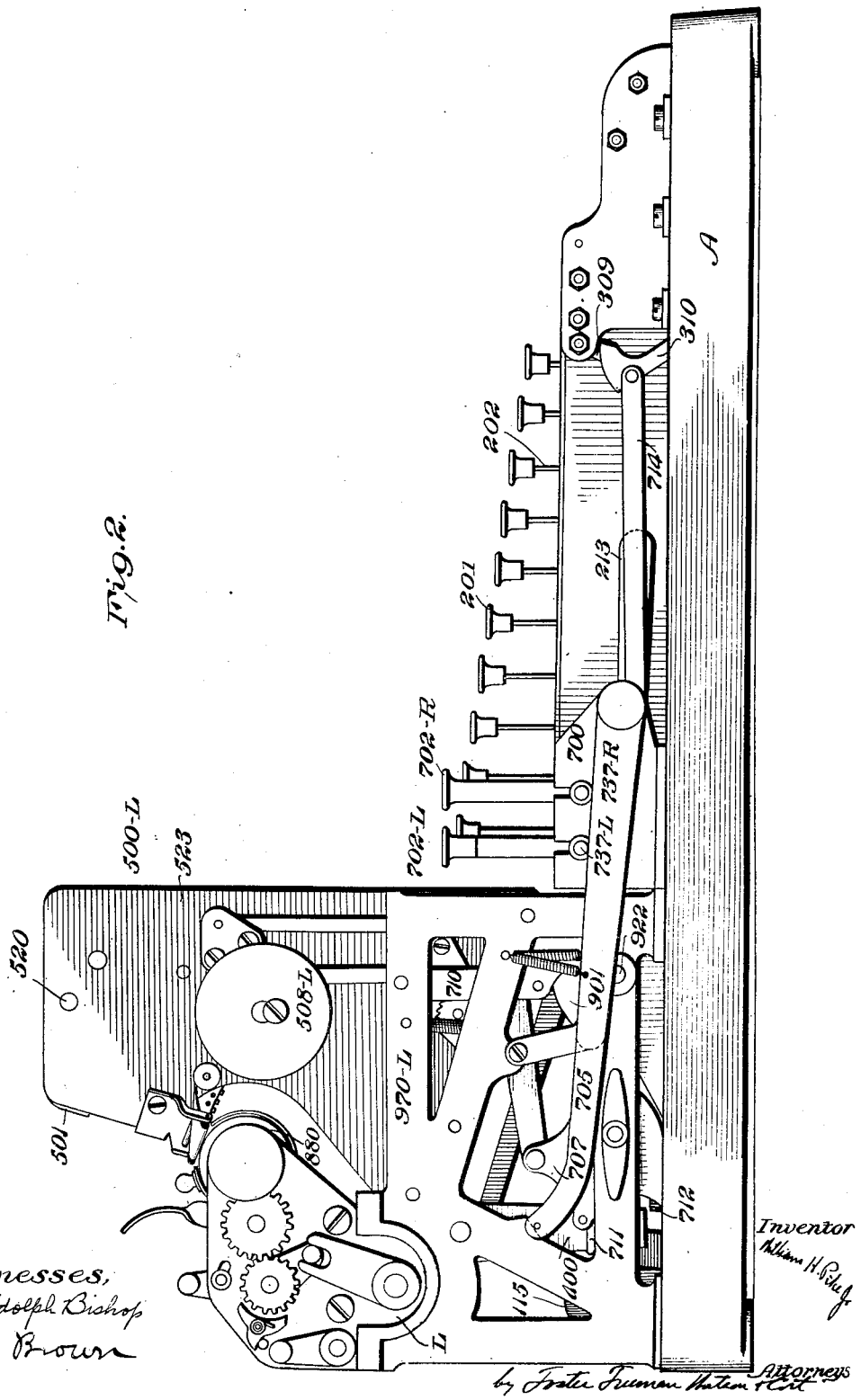

W. H. PIKE, Jr.
ADDING AND RECORDING MACHINE.
APPLICATION FILED MAY 25, 1904.
1,049,911.
Patented Jan. 7, 1913.
13 SHEETS—SHEET 3.
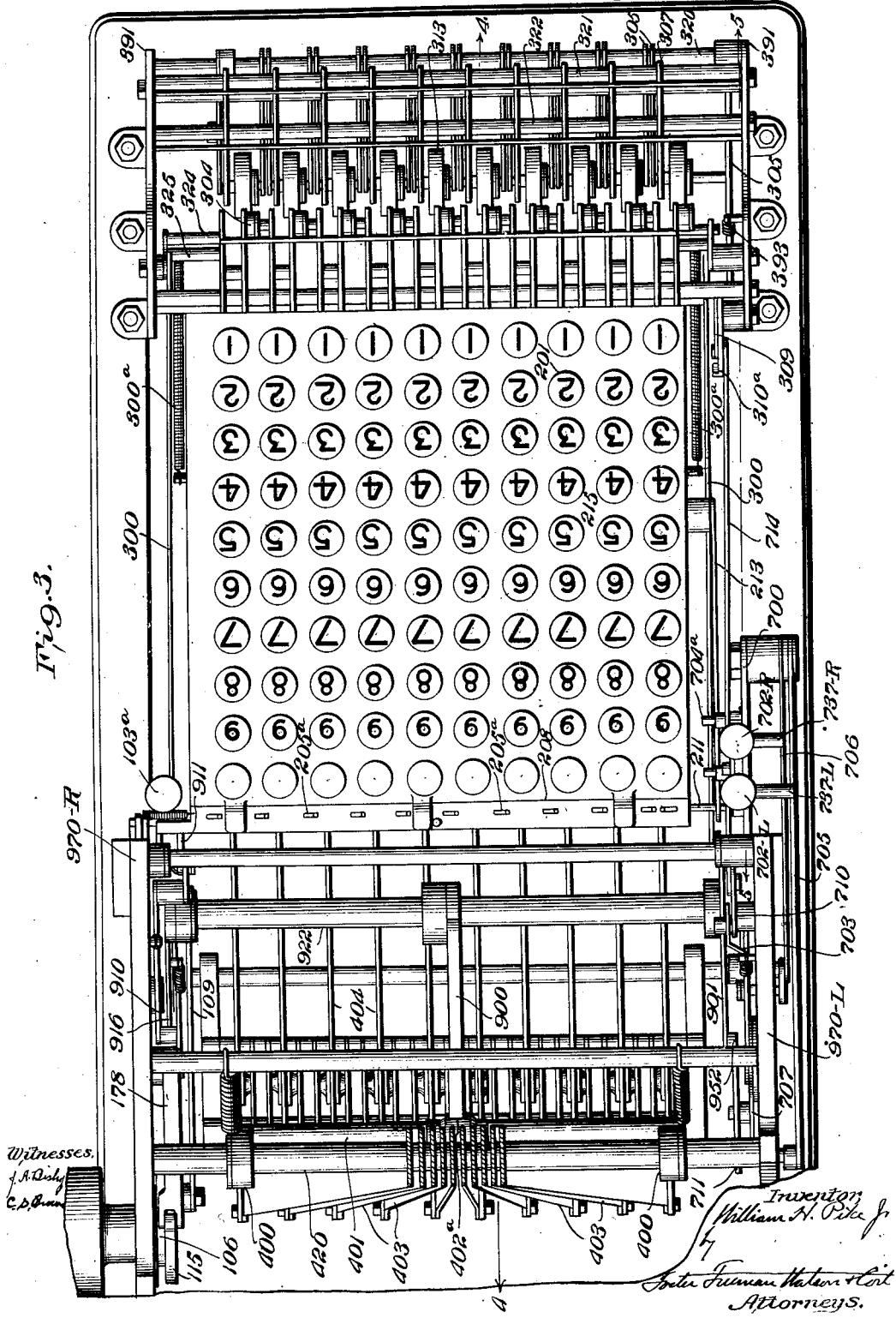

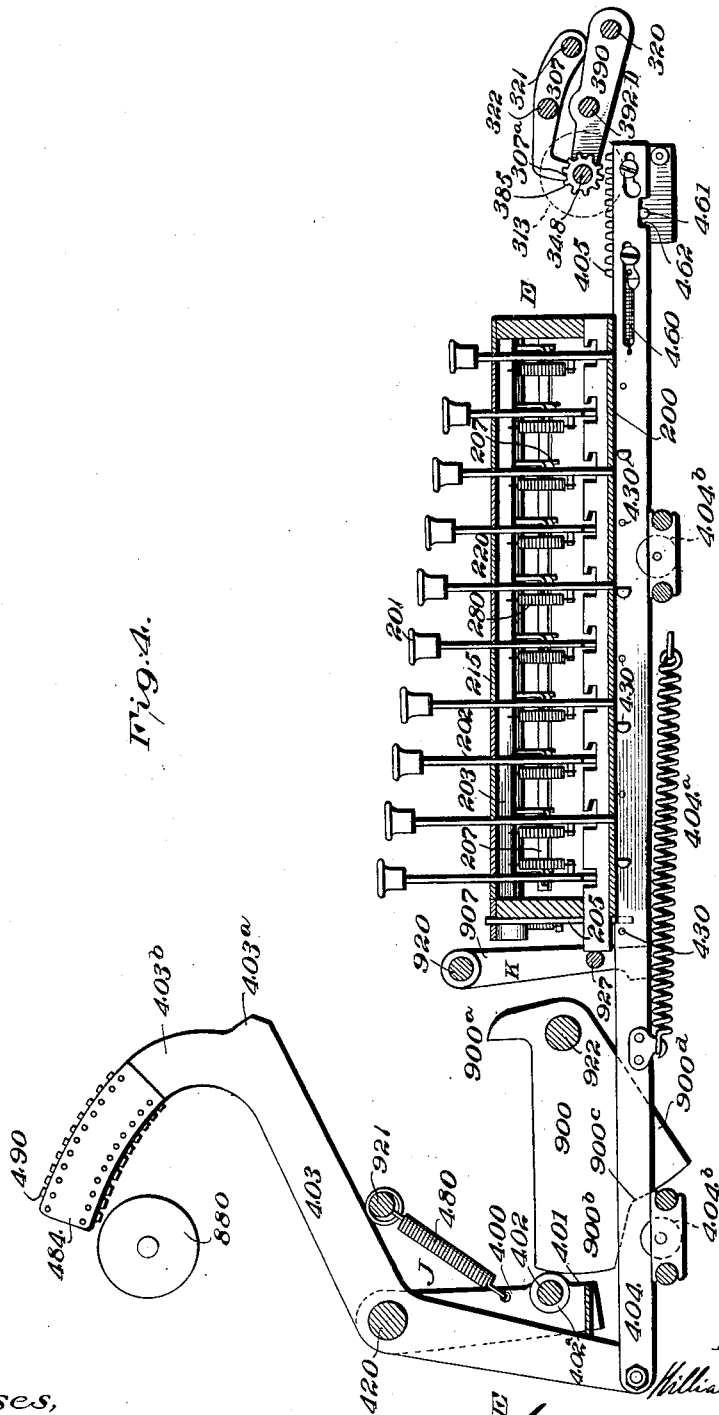

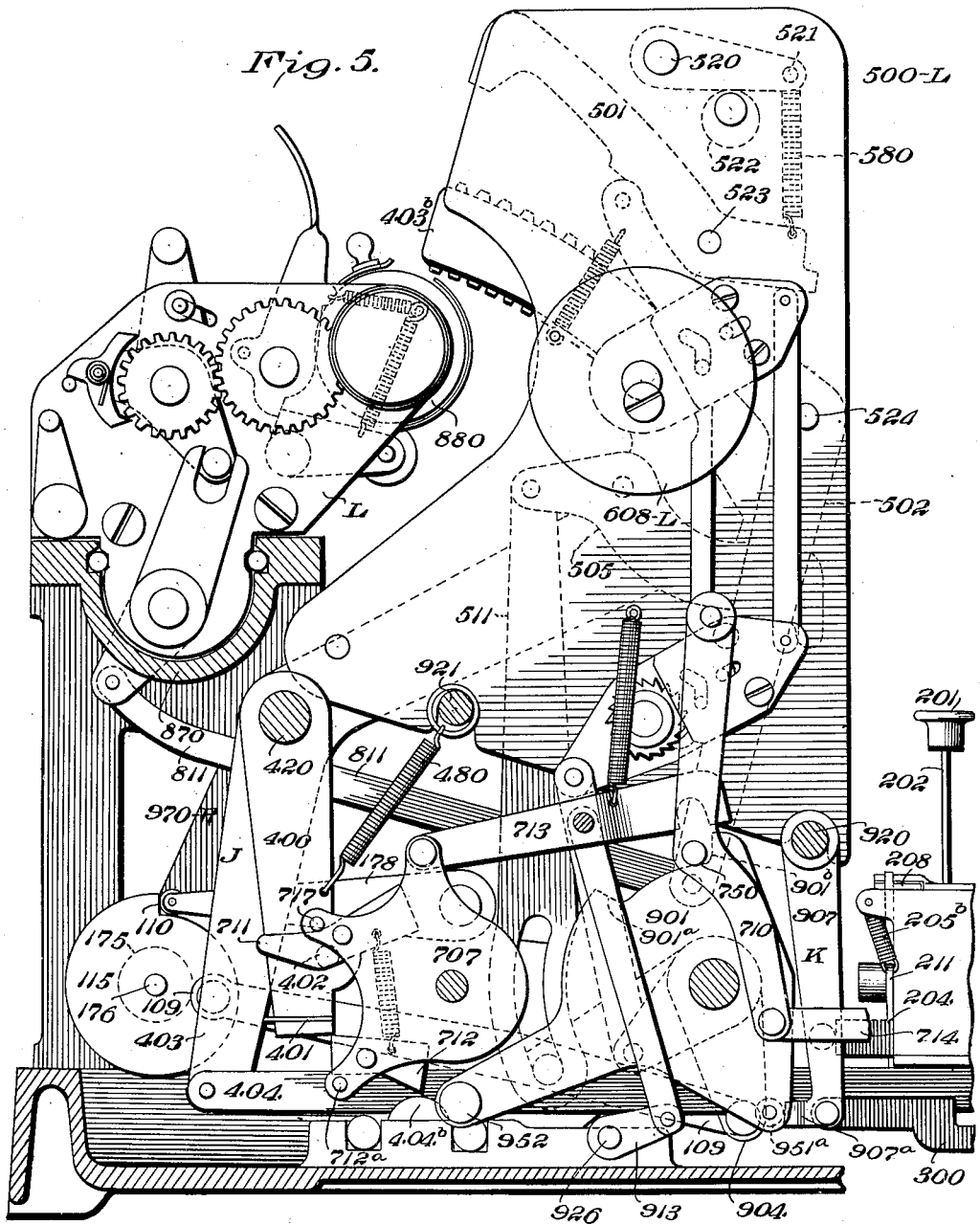

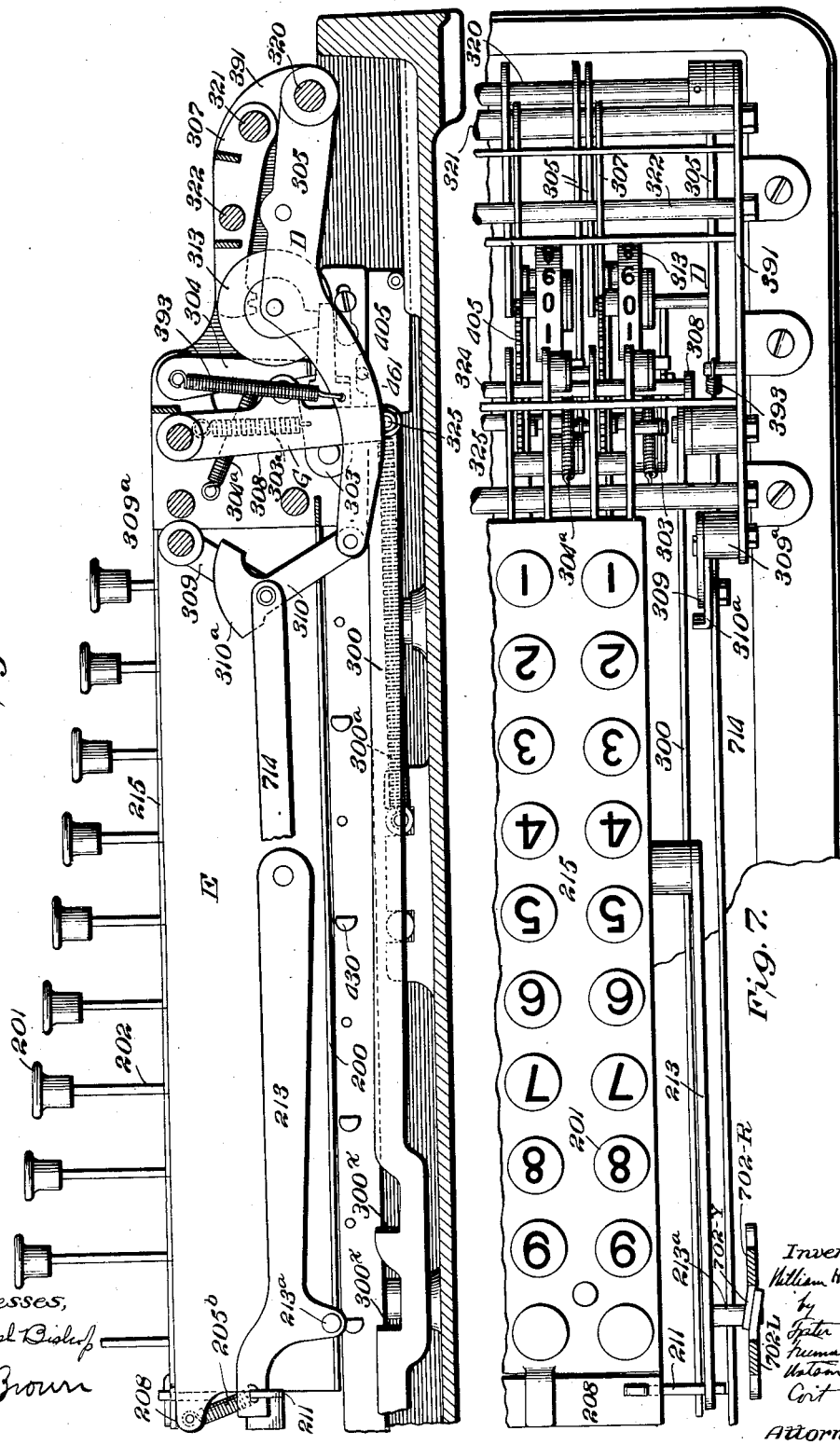

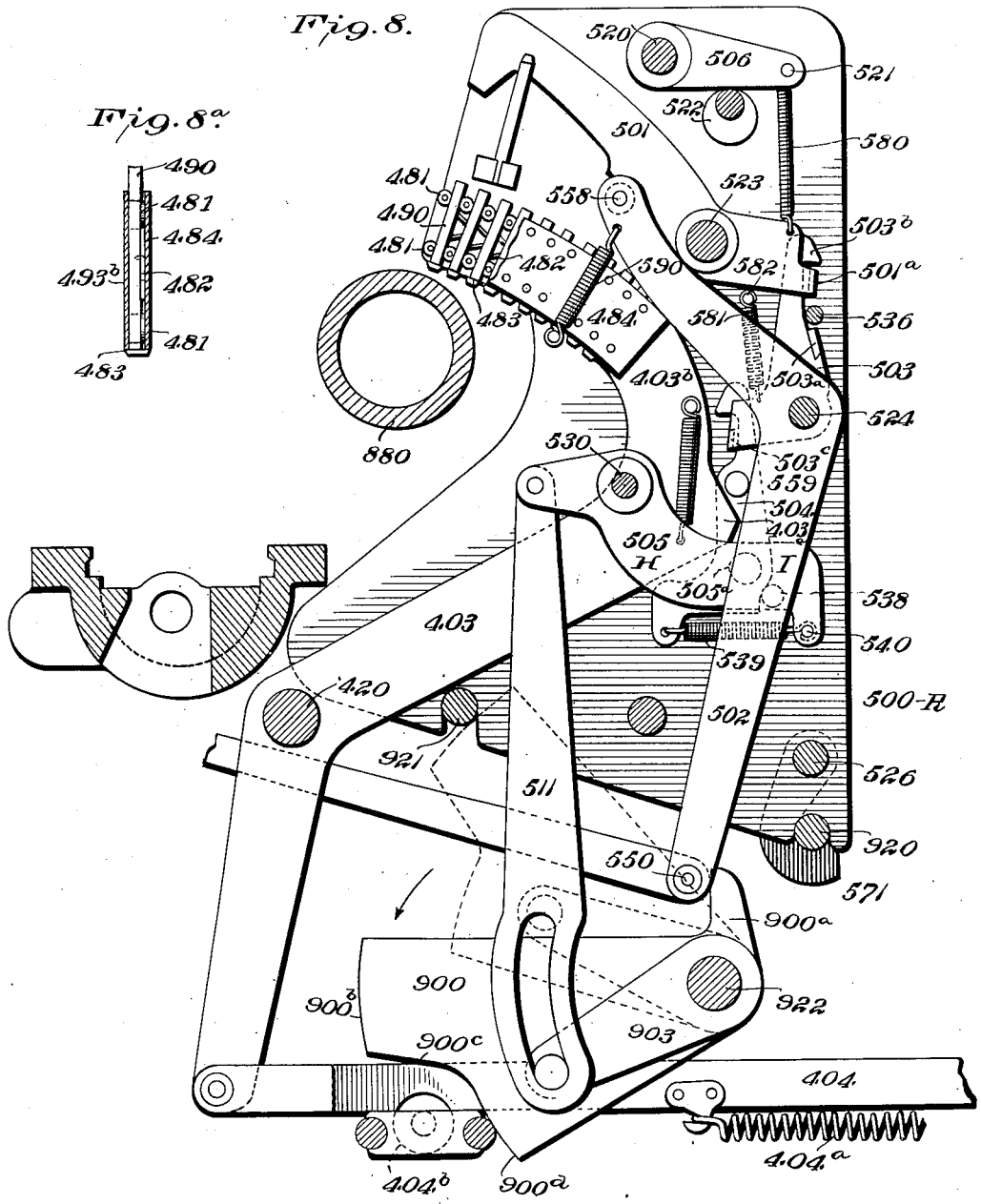

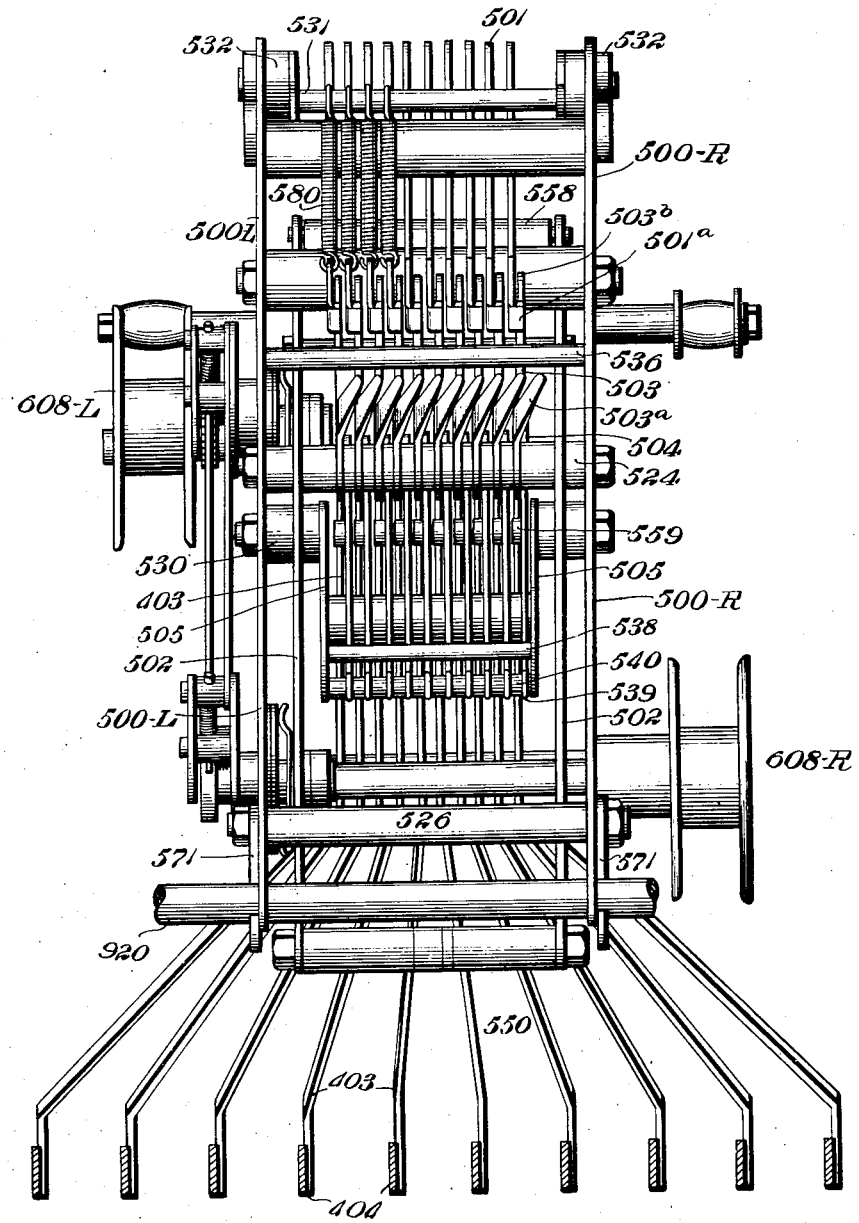

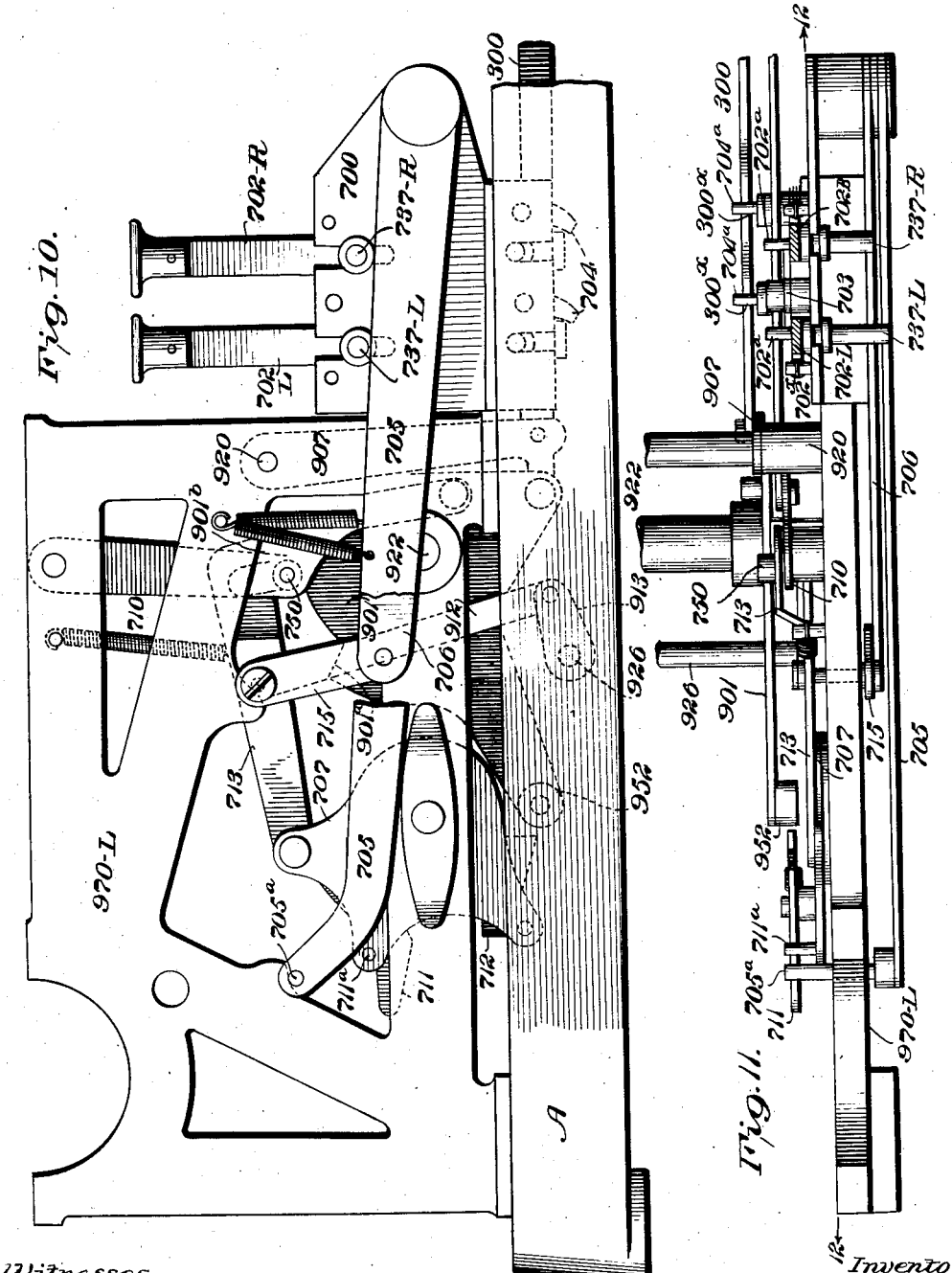

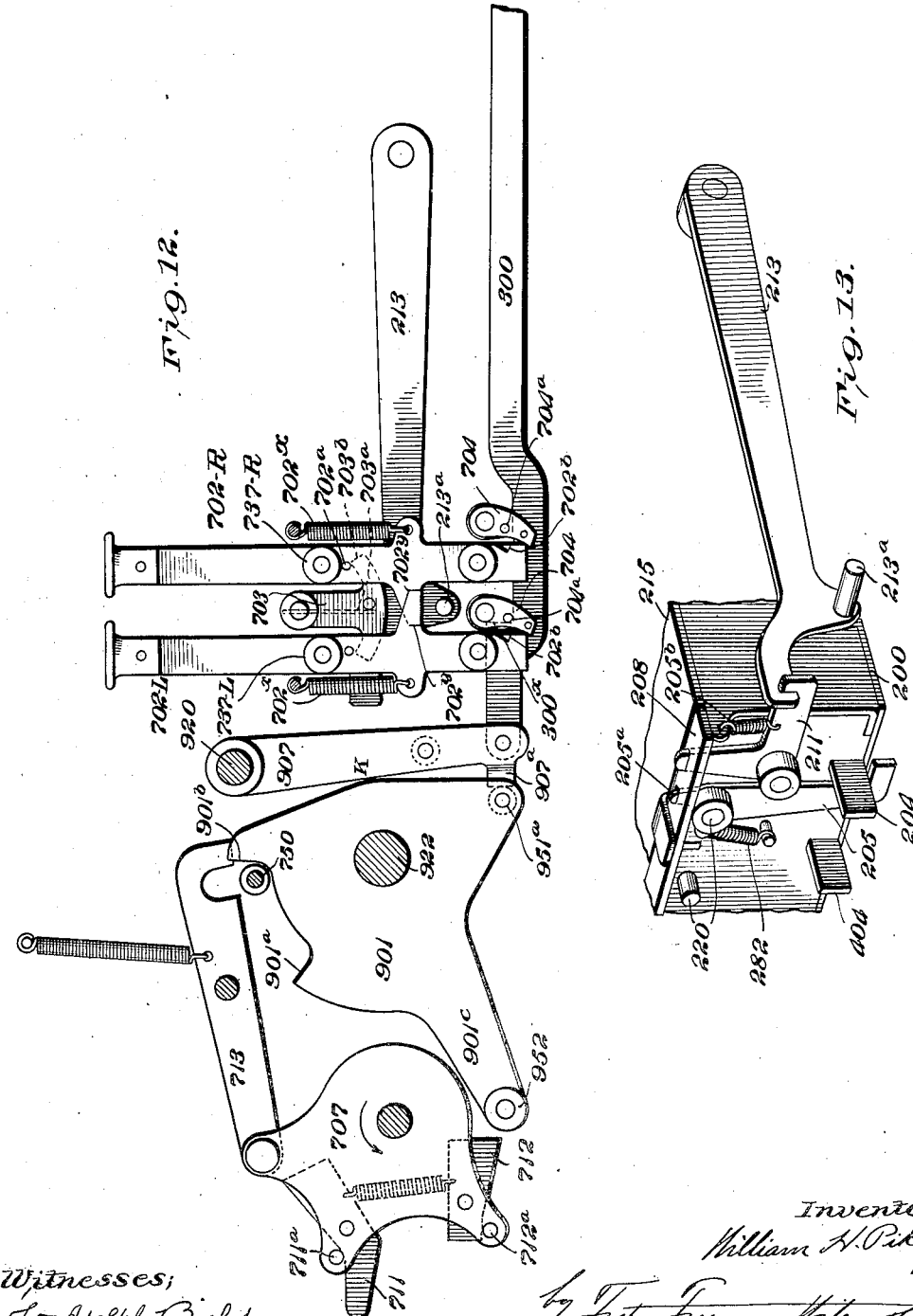

W. H. PIKE, Jr.
ADDING AND RECORDING MACHINE.
APPLICATION FILED MAY 25, 1904.
1,049,911.
Patented Jan. 7, 1913.
13 SHEETS—SHEET 11.
Fig. 14.
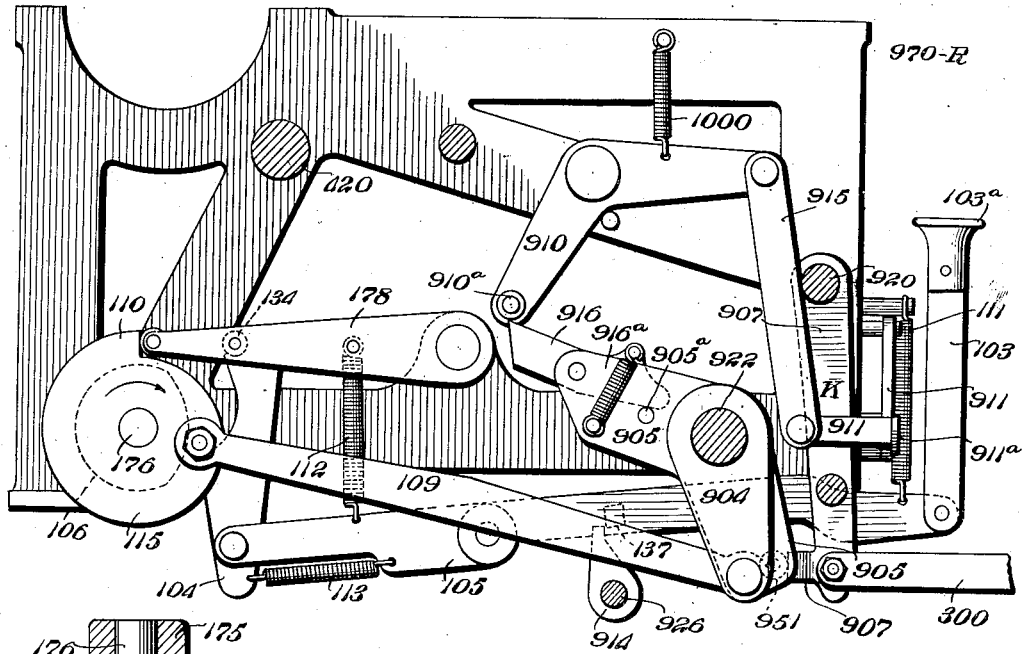
Fig. 15.
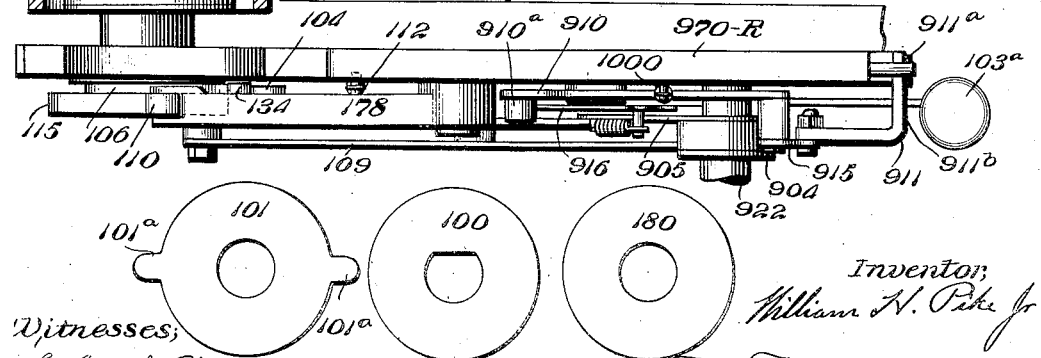
Fig. 21.
Witnesses;
J. Adolph Bishop
C. D. Brown
Inventor,
William H. Pike Jr.
by Foster Freeman Watson & Coit
Attorneys

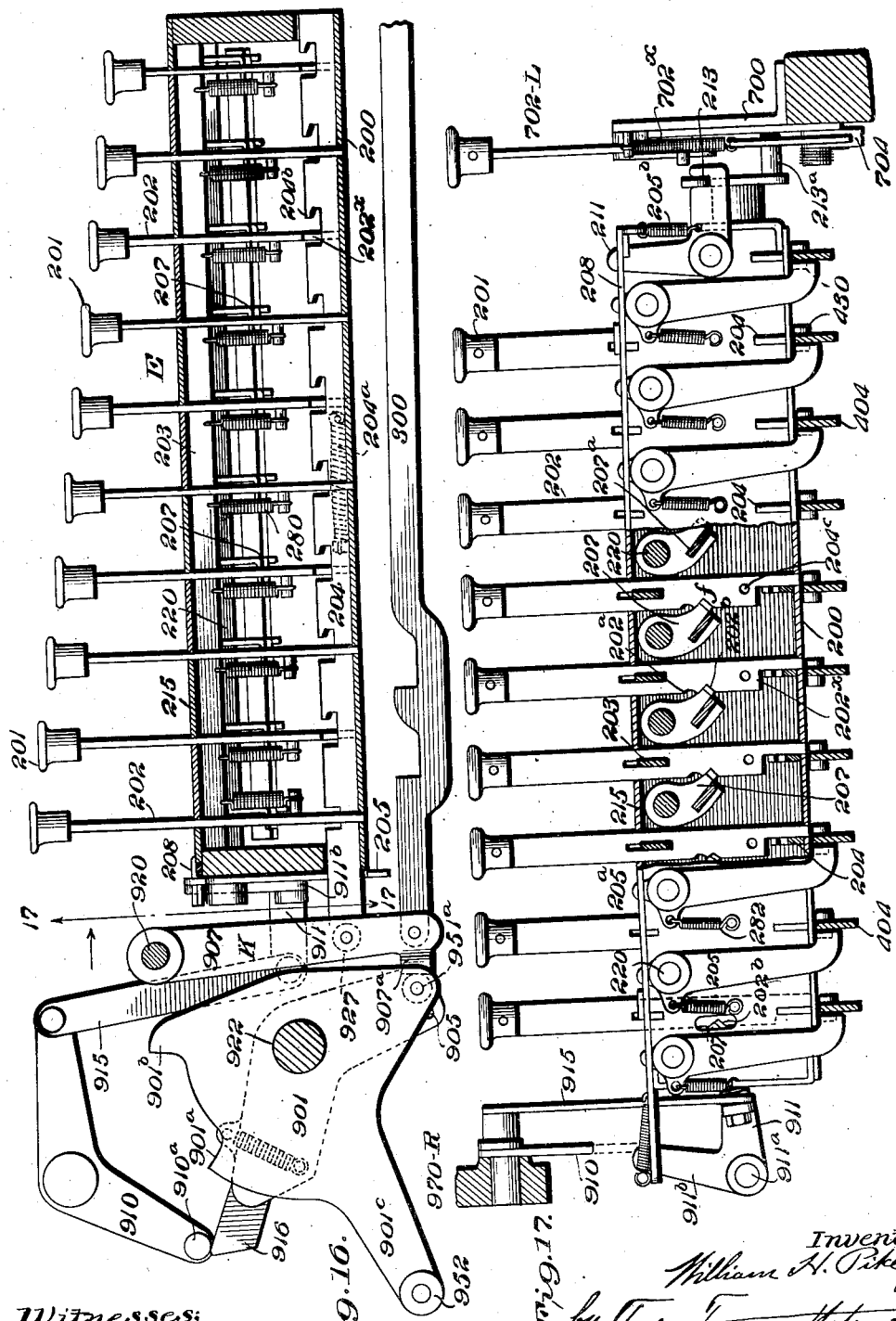

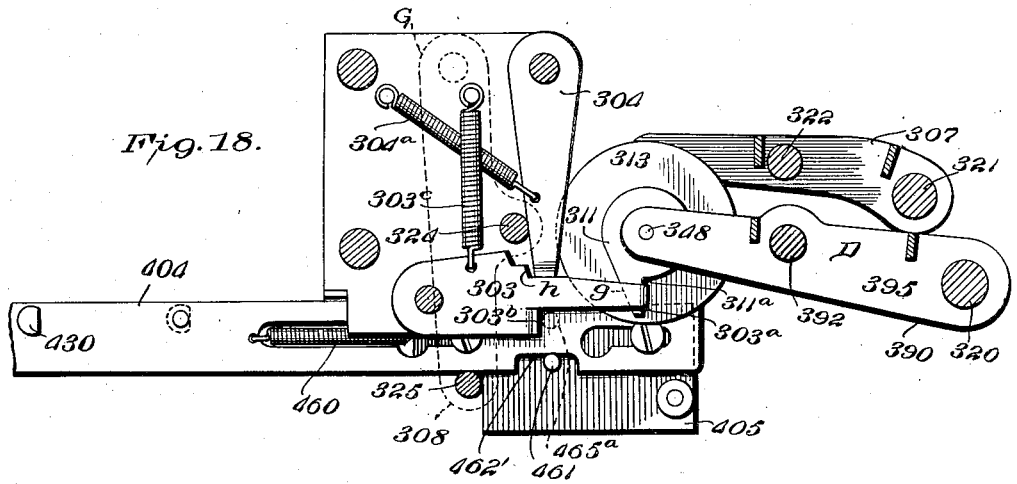
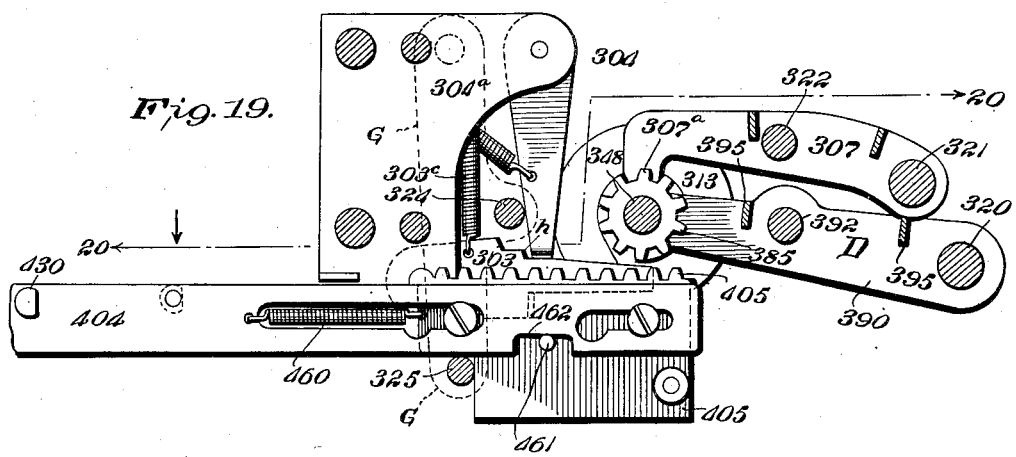
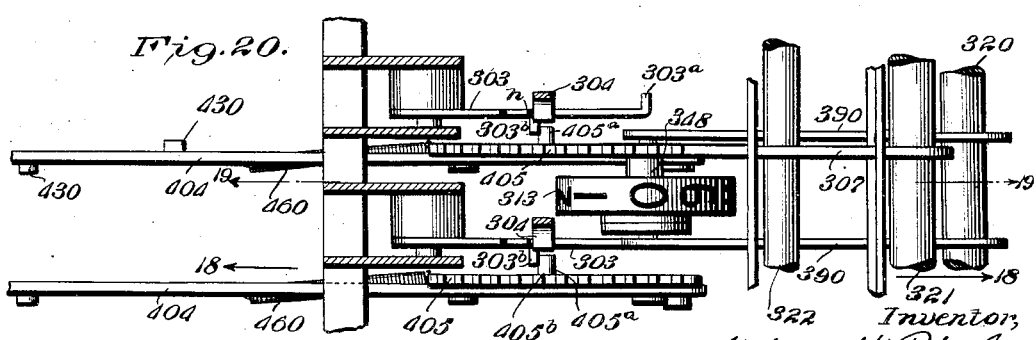

UNITED STATES PATENT OFFICE.

WILLIAM H. PIKE, JR., OF ORANGE, NEW JERSEY, ASSIGNOR, BY MESNE ASSIGNMENTS, TO BURROUGHS ADDING MACHINE COMPANY, OF DETROIT, MICHIGAN, A CORPORATION OF MICHIGAN.

ADDING AND RECORDING MACHINE.

1,049,911.   Specification of Letters Patent.   Patented Jan. 7, 1913.

Original application filed August 19, 1902, Serial No. 120,222. Divided and this application filed May 25, 1904. Serial No. 209,673.

*To all whom it may concern:*

Be it known that I, WILLIAM H. PIKE, Jr., a citizen of the United States, residing at the city of Orange, county of Essex, State of New Jersey, have invented certain new and useful Improvements in Adding and Recording Machines, of which the following is a specification.

This invention relates to adding and recording machines although some features of the invention may be used on adding machines which do not record.

The invention is particularly applicable to machines in which there is a separate series of keys for each adding wheel, but some features of the invention could be employed on adding machines using one series of keys only for all the adding wheels, and it is to be understood that while my invention as illustrated and described is embodied in a machine having several series of keys, I do not intend to restrict myself to the use of some of the features in any special class of machines.

The object of my invention is generally to produce an adding machine capable of rapid action and which can be operated with a minimum of effort on the part of the operator, and in which the possibility of involuntary error in manipulation is almost entirely eliminated.

The invention will be fully described hereinafter, reference being had to the accompanying drawings in which:—

Figure 1 is a perspective view of a machine embodying my invention; Fig. 2 is a sectional side elevation; Fig. 3 is a plan view with the paper carriage removed; Fig. 4 is a longitudinal central section of a portion of the machine; Fig. 5 is a sectional side elevation on line 5—5 of Fig. 3, of the rear portion of the machine; Fig. 6 is a similar view, also on the line 5—5 of Fig. 3, of the front portion of the machine; Fig. 7 is a part plan of Fig. 6; Fig. 8 is a sectional elevation of the type striking mechanism and adjuncts; Fig. 8ª, an enlarged view of one of the types and supports; Fig. 9 is a front view of Fig. 8; Fig. 10, is a side view of the total and sub-total actuating mechanisms; Fig. 11 is a plan view of Fig. 10; Fig. 12 is a sectional elevation on the line 12—12 of Fig. 11; Fig. 13 is a detail perspective view of a detent shifting device used in connection with the total and sub-total mechanisms; Fig. 14 is a side elevation of the driving and starting mechanism; Fig. 15 is a plan of the same in part section; Fig. 16 is a sectional view of the key operated mechanism; Fig. 17 is a vertical section on line 17—17 of Fig. 16, looking in the direction of the arrow; Fig. 18 is a sectional side view of the adding mechanism on line 18—18 of Fig. 20; Fig. 19 is a similar view on line 19—19 of Fig. 20; Fig. 20 is a plan view of a portion of the adding mechanism; Fig. 21, a detail view of the friction disks and rings of the driving mechanism; Fig. 22, a plan showing the arrangement of numbers at the lower ends of the types of each carrier.

*The driving means.*—A is the base; 313 are adding wheels, and 201 are keys in series, each series numbered 1 to 9. The working shaft 922, Figs. 4, 14, 15, is a rock shaft with two arms 904 and 905, at one end and to the arm 904 is connected a link 109 also connected to the side of a cam disk 115, Figs. 5 and 14, on a short shaft 176 around which turns a hollow driving shaft 175. All the movements of the different parts of the machine necessary to add and record any number after depressing the necessary keys, are imparted on a single movement or rotation of the operating shaft 176, which is then arrested at a point where the said parts have assumed their normal position of rest. To avoid the delay, labor and uncertainties resulting from operating the working shaft by hand, the shaft 175 is driven continuously from a suitable motor as by a belt on a pulley 100°, Fig. 1, and has such a frictional or other connection with the shaft 176 that the two will turn together so long as the shaft 176 is free to turn but when the rotation of the shaft 176 is arrested that of the shaft 175 may continue. Any suitable frictional or other connection capable of permitting the shaft 176 to be arrested when required may be used but one which has proved effective will now be described. The shaft 176 is provided with a series of disks 100 fitted on the shaft to turn with it but movable on the shaft lengthwise. Alternating with these disks are rings 101 fitted to turn loosely on the shaft 176 and having projections 101ª on their peripheries, and between each ring 101 and disk 100 is a ring 180 of non-abrasive material, these rings 180 being also fitted to turn loosely on the shaft 176. The shaft 176 is threaded to receive a nut 150 and a spring washer 102 is interposed between the nut and the outer disk 100, and by adjusting the nut the rings and disks are pressed together. The inner end of the shaft 175 is enlarged and recessed so as to inclose the rings and disks and is provided with suitable grooves 172 to receive the projections 101ª of the rings 101. The pressure of the nut 150 and washer 102 produces friction between the disks 100 and rings 101 and 180 which tends to turn the auxiliary shaft 176 supporting the disks. These parts constitute a friction clutch having driving and driven members which insure the frictional connection between the shafts 175, 176, so that although the shaft 175 (Fig. 15) rotates continuously, the shaft 176 which operates the parts of the machine cannot start until a detent, for instance a latch 178, is lifted from the shoulder 110 of the cam disk 115. This results from depressing a key 103ª, Figs. 1 and 14, thereby rocking a lever 105 connected therewith and raising a link 104 on the upper end of which bears a lug 134 on the latch 178. A spring 112 draws down the latch 178. A cam 106 on the shaft 176 on each rotation pushes back the link 104 from below the stud 134 so that the latch 178 will drop into position to be struck by the shoulder 110 and stop the operation of the said parts after each number is registered or recorded, as for instance, at the end of a complete rotation of the shaft, and after effecting a complete oscillation of the working shaft 922, and this results even if the key 103ª is held down continuously. It will be seen that the working shaft is not actuated by the power of the operator, but is positively driven by the motor to effect a complete operation and is then automatically arrested, the operator simply depressing a starting device after the keys have been properly adjusted to determine the amount to be indicated.

*The adding or accumulating means.*—The recording devices, as shown, consist of type levers 403 (Figs. 4 to 8), one to each series of keys, and which oscillate on a shaft 420 and each is jointed to a strip 404 carrying a rack 405, which actuates the pinions 385, Figs. 4, 18, 20, secured to the adding wheels 313 carried by a swinging frame D. Fixed pawls 307, Figs. 18, 19, 20, serve to lock the pinions 385 when the frame D is raised to prevent accidental turning. Each rack 405 has a sliding movement on the strip 404 and is drawn back by a spring 460, Figs. 18, 19, 20. A lug 461, Figs. 18, 19, on the rack projects into a recess 462 in the strip and limits the sliding movement of the rack.

When the adding wheels are turned in the direction of the arrow, Fig. 18, the shoulders 311ª of cams 311 (one at the side of each wheel) are carried away from the lugs 303ª on detents 303, and the inclined edge $g$ of each cam 311 will nearly contact with the end of its detent 303 when the wheel has been turned nine units or steps. In moving the tenth step, the edge $g$ will depress the detent which will thus carry a lug 303ᵇ on the detent 303 out of the path of a stud 405ª (Figs. 18 and 20) on the rack that coacts with the adding wheel of the next higher order of numbers, and the rack will thus be permitted to move a step beyond its normal position at rest and thus move its coacting pinion and adding wheel a step upon the completed revolution of the cam 311 of the wheel of the lower order.

When the detent 303 is depressed, a vertical pawl 304, Figs. 18 and 19, will move forward over a shoulder $h$ of the detent and then prevent it from rising until a frame G (Figs. 6, 18, 19) swings back a bar 324 carried thereby and pushes forward the pawls 304 from off the shoulders $h$ of the detents 303 which are then lifted by springs 303ᶜ. The frame D is swung to carry the pinions of the adder wheels into and out of engagement with the racks by either of two independent means actuated from the working shaft. Thus the left hand arm 305 of the frame D, Figs. 6 and 7, connects with a toggle link 310 jointed to the other toggle link 309, the movement of the toggle raising and lowering the frame D. The toggle is operated from a reciprocating link 714, the movement being limited by a lug on a plate 310ª at the end of the link 310.

The link 714 is connected to an arm 710 (Fig. 5) and as the shaft 922, (Figs. 5 and 12) oscillates in one direction, the rear shoulder 901ª on a plate 901 on said shaft contacts with a stud 750 on the lever 710, Fig. 5, which swings forward; the return movement brings the shoulder 901ᵇ to the stud, swinging back the lever 710.

The stem 202, Figs. 16 and 17, of each numbered key 201, has notches 202ª and 202ᵇ of different depths. Springs 280 lift the keys, and pawls 207 which are secured to longitudinal shafts 220, engage the notches and hold down the keys; the pawls of each series of keys being on the adjacent shaft so that after one key of a series is depressed, the depression of another key in the same series will swing out all the pawls and release the depressed key which will rise. The depression of the upper blank key of a row swings the pawls to liberate a key of that row improperly depressed, the upper key rising as soon as pressure is removed therefrom, as the notches of such keys are not so arranged that they will be held down by the pawls.

On depressing a key, its lower end is brought into the path of one of a series of studs or stops 430 projecting in both directions from the co-acting rack strip 404 and the key stem thus limits and defines the subsequent movement of the strip and its rack and the extent to which the number wheel is turned, the stops 430 being progressively farther from the key stems, so the strip moves to a greater extent in proportion as the key depressed indicates a higher number, as shown, and the parts are arranged so that each strip has a movement of one step at each operation of the machine, even if no keys may have been depressed. This will bring the cipher printing character into printing line but without turning the adding wheel. The normal position of the stop 430 on the strip 404 which co-acts with each key numbered 1, is two steps to the rear of said key, the position of the other stops 430 being progressively one step farther to the rear of its co-acting key stop, the stud 430 which co-acts with each 9 key being ten steps away.

A detent arm 205, Figs. 4, 13, 16, 17, secured on each shaft 220 near its end is held in the path of the stop 430 on the strip 404 near the No. 9 key by a spring 282, Fig. 13, which also tends to turn the shaft 220 and hold the pawls 207 against the key stems and in the notches thereof.

When all the keys in a column are up, the pawls 207 are all in the deep notches 202ᵇ, and the detent arm 205 of each shaft acts as a stop for the co-acting strip 404, which can only move one step forward until its stop 430 strikes the arm 205, securing the result before stated. When one of said keys is depressed, its pawl 207 is swung out from the deep notch and then enters the shallow notch 202ᵃ and holds the key down, and all the co-acting pawls swing out but not far enough to remove them from the deep notches 202ᵇ of the other keys of the series, but the co-acting detent arm 205 is carried out of the path of the stop 430 on the strip 404, which can then slide forward until its adjacent stop 430 strikes the stem of the depressed key.

The type lever shaft 420, Figs. 4 and 5, carries two pendant arms 400, Fig. 3, connected by a cross strip 401 and cross rod 402, the latter carrying a roll 402ᵃ, Fig. 4, which bears on a reciprocating cam plate 900 on the shaft 922. The strip 401 holds the lower ends of the type levers 403 in their rearmost positions each against the tension of a spring 404ᵃ.

The rack carrying strip 404 of each column at each operation where no keys are depressed moves forward one step until arrested by the detent arm 205, and in this case the rack of said strip will not be moved.

When a numbered key is depressed, the strip 404 moves forward until its stop strikes said key, carrying the rack, without turning the pinions, the frame D being normally elevated; after the movement of the strips ceases, the frame D and pinions are depressed automatically and each rack engages the pinion and on returning turns the pinion and adding wheel if they are engaged, the extent of revolution depending on the distance the strip 404 in returning to its position moves the rack.

To the swinging frame G, Fig. 6, and dotted lines, Figs. 18, 19, are attached two longitudinal rods 300, Fig. 7, connected to a swinging frame K, Figs. 4, 5, 10, 12, 14, 16. A roller stud 951ᵃ on the plate 901, Figs. 5 and 16, and a roller stud 951, Fig. 14, on the arm 905, Fig. 14, when the machine is at rest, are in contact with projections 907 and 907ᵃ on the frame K and the swinging frame G is thus held in forward position.

In operating the machine, the shaft 922 is rocked and the roller studs on the plate 901 and arm 905 are first withdrawn from the projections 907 and 907ᵃ the two rods 300 and the frame G are drawn to the rear by springs 300ᵃ, Fig. 6, so that the pawls 304, Fig. 18, will bear against the edges below the shoulders h of the detents 303 under spring tension and the racks 405 can be held by their springs 460 with the lugs 405ᵃ, Fig. 20, resting against the lugs 303ᵇ.

When a number key or keys have been depressed, and the working shaft is operated, each coöperating strip 404 is carried forward to an extent depending on the key depressed the frame D is then depressed to bring each pinion 385 into engagement with its rack 405, and on the next backward movement of each strip the number wheel is turned to an extent corresponding to that to which the rack was carried forward.

If any one wheel is turned sufficiently to depress the adjacent detent 303, the backward swing of the frame G will then permit the pawl 304 above said detent to swing back when, having escaped contact with the edge in front of the shoulders h, it passes to a position above said shoulder and then holds down the detent until the coacting rack 405 completes its movement and the action for carrying—to the next wheel—is effected.

As the movements of the working parts of the machine terminate, the frame G swings forward and the pawls 304 are swung forward to normal position and release the detents 303 which then rise. This movement of the frame G, also moves the racks 405 forward to normal position by the contact therewith of the cross bar 325 carried by the arms 308 of the frame G.

It will be understood that each spring 460 forms a flexible connection between one of the strips 404 and the rack 405 supported by said strip. Normally the detent 303$^b$ holds the rack 405 in such position that the spring 460 connected to that rack is under tension.

If during the operation of the machine the strip 404 and rack 405 of the order to which an additional carrying operation is to be imparted are stationary or in their normal positions at the time the cam 311 of the wheel 313 of the next lower order rocks the lever 303, the spring 460, being as aforesaid under tension, collapses and, although the strip 404 remains stationary, the rack 405 is moved relative to said strip through a distance corresponding to one step. If, however, the spring and rack of the order to which the carrying is to be transmitted be in motion at the time when the detent 303$^b$ is removed from the path of the stud 405$^a$ the rack will continue to move with the strip 404 throughout the entire movement of the latter, the spring 460 acting at such time merely as a connecting link, between the strip and rack, and will not be stopped as it commonly is one step before the strip 404 completes its rearward movement. That is, in the latter case the rack and strip will move together throughout the entire rearward movement of the strip whereas normally the detent 303$^b$ acting on the stud 405$^a$ stops the rearward movement of the rack one step in advance of the completion of the corresponding movement of the strip.

*The registering or recording means.*—The roller platen 880, Figs. 4, 5, 8, is below the curved arms 403$^b$ of the type levers 403, each as shown carrying ten sliding type bars 490 and each is combined with a reciprocating member which operates it, said members shown as strips 404.

At each full operation effected by one rocking movement of the shaft 922, each type carrier will move at least one step, so that in all columns where no key is depressed the carriers will be in position to print ciphers, and in columns where keys are depressed the carriers will be moved different degrees to bring each type bar in position to print a figure corresponding to the key depressed in such column. The type bars are moved to effect the printing by spring actuated hammers 501, one to each type carrier. A series of pivoted catches 503, Fig. 8, hold back the hammers, each of which has a lateral lug 501$^a$ on its forward end engaging a hook 503$^b$ on the head of a swinging catch 503.

At each operation of the machine, the arm 903, Fig. 8, moves to the position indicated in dotted lines, lifting at the end of its movement a link 511, and rocking a pawl carrying frame H on its shaft 530. In columns where a key is depressed the type levers 403 will have moved sufficiently to carry projections 403$^a$ above studs 559 on pawls 504 pivoted at 505$^a$ to the frame H, which pawls have hooks that, when the forward end of the frame H descends, will engage projections 503$^c$ of the respective catches 503 and swing back their upper ends and release the hammers. In columns where no key is depressed the type levers do not rise sufficiently to carry their projections 403$^a$ above the roller studs 559, and when the pawls 504 co-acting with such columns descend their upper ends will be pushed forward by the projections 403$^a$ and their hooks will not engage the projections 503$^c$ and consequently the hammers in such columns will not be released.

To print ciphers to the right of the columns of highest order in which a figure is printed, each catch 503 has a lug 503$^a$ engaging the catch 503 next to the right, (see Fig. 9) and the movement of one catch 503 to release its hammer will be transferred to the next and so on, and thus effect the movement of all the other catches 503 to the right even if no key has been depressed. This permits the hammers to the right to be released to print ciphers but no catches to the left will be moved.

To restore the hammers to normal position, there is a swinging frame I, Fig. 8, consisting of the side levers 502 and connecting bars 550, 558, the latter extending across under the hammers. A projection 900$^a$ on the cam 900 on the shaft 922 engages the bar 550 and swings the frame to lift the bar 558 and the hammers as the shaft 922 rocks on returning to position.

In starting, the frame I swings under the action of the spring 590 to carry the bar 558 down, leaving the hammers free.

*The adding or accumulating operations.*— To add different amounts together, the proper keys are depressed and the starting key 103$^a$, Fig. 14, is depressed, lifting the latch 178 and permitting the shaft 176 to make one effective movement, when the connecting pitman 109 will rock the shaft 922, and a reciprocating member in the form of the main cam 900, Fig. 4, will be rocked and permit the frame J, Figs. 4 and 5, to swing forward and thus permit the type levers and the reciprocating members or strips 404 to move under the influence of the springs 404$^a$ until in those columns where no keys are depressed, the strips are arrested by the detents 205, Figs. 13 and 16, and where keys have been depressed the strips are arrested by their respective key stops.

The racks 405 remain stationary, being held against the cross bar 325 by the springs 460 until the strips 404 have each moved one unit when the racks will also move. This permits each strip when no key is depressed to move sufficiently to bring the type carrier into position to print a cipher at the printing line.

The first portion 900$^b$ of the cam 900, Figs. 4 and 8, permits no movement of the frame J, Fig. 4; a second portion 900$^c$ permits the entire forward movement of the frame J; and a third portion 900$^d$ does not affect the movement of the frame. This construction of the cam allows certain movements of other parts while the strips 404 and racks 405 are not in motion. After the strips are arrested the pinions are thrown into gear with the racks and on the return motion of the cam 900, the strips 404 and racks 405 are returned to their normal position, the racks turning the pinions a number of units depending on the extent of return movements of the strips 404 and equal to the numbers expressed by the depressed keys. The final part of the return movement of the shaft 922 causes the plate 901, Figs. 5 and 10, to move the lever 710, and the link 714 to break the joint of the toggle 309, 310, and permit the frame D, Fig. 19, to rise and disengage the pinions from the racks.

To lock down a depressed key and lock all others keys in the same series against depression during the operating movements of the shaft 922, a series of sliding strips 204, Figs. 16, 17, have projections 204$^b$ adapted to enter holes 204$^c$ in the key stems which are depressed. The strips are moved in one direction by springs 204$^a$ and in the other by a cross rod 927 carried by the frame K, Figs. 4, 16. When the shaft 922 begins to oscillate, the frame K will swing and allow the strips 204 to move toward the rear under shoulders 202$^x$, Figs. 16 and 17, of keys that are not depressed and prevent them from moving down, and a projection 204$^b$ will enter the hole 204$^c$ of a depressed key and lock it down even if its pawl be accidentally disengaged from its notch 202$^a$.

The shafts 220 can be rocked automatically to throw out all the pawls 207 by a sliding cross strip 208, Figs. 13, 16, 17, having elongated slots into which project lugs 205$^a$ on the arms 205. This is effected from the rocking of the shaft 922. Thus at the commencement of the motion of the shaft 922, Fig. 14, the arm 905, carries a latch 916 past a stud 910$^a$ on a lever 910, a spring 916$^a$ permitting the latch to yield and pass by the stud and on the return motion of the shaft 922, the beveled edge of the latch 916 contacting with the stud 910$^a$, swings the lever 910, and passing by permits the lever to return to its normal position under the action of a spring 1000, Fig. 14. This lever 910 is connected by a link 915 with an angle lever 911, Figs. 14, 15, 16, pivoted at 911$^a$ to the side frame and provided with an arm 911$^b$, Fig. 17, which extends loosely through a slot in the end of the strip 208, and the movement of the lever 910 will thus rock the lever 911 and slide the strip 208 in the direction of the arrow, Fig. 17, and thereby withdraw all the pawls 207 and release any key which may be have been depressed.

*Recording totals and sub-totals.*—To record the total, it is necessary to control the movements of the recording devices by the accumulating mechanism, as for instance, by controlling the movements of the racks by the pinions of the wheels 313, the racks in such case being engaged with the pinions when the racks and the strips 404 are moving forward, under the action of the springs 404$^a$. The rotatory movement of the pinions and wheels 313 is thus in the reverse direction to that when accumulating, the effect being that the amount accumulated is subtracted as the wheels and pinions return to the zero position. The pinion cams 311, Figs. 18, 20, arrest the reverse rotation of the wheels at the zero position when their shoulders engage the lugs 303$^a$ of the detents 303. As, in accumulating, the wheels have advanced in the direction of the arrow, Fig. 18, a number of steps from the zero position, so in returning to the zero position the racks and strips are allowed to move forward the same number of steps, until the shoulders of the cams contact with the detents, thus moving the type-levers correspondingly and bringing the proper types in position to indicate the total as accumulated. The accumulating wheels will be left at zero, after registering or printing the total, except when the total is to be re-accumulated on the wheels 313, which is effected by keeping the racks and pinions engaged when the racks are again moved to the rear or restored. These results are effected by so setting the parts as to vary the times of engaging and disengaging the racks and pinions, and one means of doing this is by two keys, distinguished as total and sub-total keys 702$^R$ and 702$^L$, Figs. 12, 16 and 17.

At the rear of the shaft 922 is a shaft on which rocks a plate 707 carrying two dogs 711, 712, normally held in contact with stops by a connecting spring 707$^c$ shown in dotted lines, Fig. 12. To this plate is pivoted a link 713, which is raised by a spring 713$^a$ and has a notch adapted to engage the stud 750 on the lever 710. Two parallel levers 705, 706, Figs. 10 and 11 extend past the keys 702$^L$, 702$^R$, and past the plate 901, and the lever 706 is connected by a link 715 (Fig. 9) with the link 713.

When the total key 702$^R$, Figs. 2, 10, 12, 17, is depressed, its stud 737$^R$, Figs. 10 and 11, depresses the lever 706, Figs. 10 and 11, and the connected link 713, the slot in which, Figs. 10 and 11, engages the stud 750 on the lever 710 so that the lever 710 and link 714 will be operated from the plate 707. When the shaft 922 commences to rock clockwise, the roll 952, Figs. 5 and 12, on the arm of the plate 901 moving upward contacts with the rear edge of a dog 712 rocking the plate 707 in the clockwise direction and the link 713 (now connected to the lever 710, Fig. 5), through the link 714 and connections, straightens out the toggle and depresses frame D causing the pinions to engage the racks. The strips 404 move forward with the racks until the wheels 313, turning in the reverse direction of the arrow, Fig. 18, return to the zero position where they are arrested by the shoulders of the cams 311 contacting with the projections 303$^a$ of the detents 303. The racks will be held in their forward position during the printing action while the part 900$^d$ of the cam 900 moves in one direction past the roll 402$^a$, Figs 4 and 8. On the return movement, the roll 952, Fig. 12, contacts with the forward edge of the upper dog 711, and rocks the plate 707 in the direction of its arrow, and the link 713 pulls the lever 710 rearwardly bending the toggle, and lifting the frame D disengaging the pinions from the racks. The continued movement of the cam 900 anti-clockwise Figs. 4 and 8, restores the racks to their forward position.

The sub-total key 702$^L$, Figs. 2, 10, 11, 12, 17, operates on a lever 706 and on a second lever 705, Fig. 11, which has a lug 705$^a$, Figs. 10, which when the lever is depressed, contacts with the tail of the dog 711 and depresses the tail of this dog, swinging it out of the downward path of the roll 952, which therefore in such case cannot operate it to rock the plate 707 and renders the said plate then inoperative to shift the lever 710 and the racks. The sub-total key stud 737$^L$ projects over both the levers 705 and 706, so that when the sub-total key is depressed, the lever 706 is carried down with the lever 705 and the open-slotted link 713 is engaged with the stud 750 on the lever 710, and therefore when the machine is thus operated, the pinions are thrown into engagement with the racks on the plate 707 being rocked by the contact of the stud 952 and pawl 712 before the racks move forward, and they continue engaged on the reverse movement (as the stud 952 on descending will not contact with the pawl 711$^a$) until the racks are restored to their rear position, when the frame D is raised and the pinions are disengaged by the action of the front shoulder 901$^b$ (Fig. 12) on the plate 901, contacting with the stud 750 on the lever 710 as in accumulating.

The keys 702$^R$ and 702$^L$ each carries a stud 702$^a$, and when either of the keys 702$^{L-R}$ is depressed, its stud swings anchor plate 703, Fig. 12, out of its path and under the other stud, thus preventing the other key from being depressed, so that both cannot be depressed at once.

There are two pawls 704, Fig. 12, each adapted to engage a notch 702$^b$ in a key stem, and each pawl has a stud 704$^a$ which when the machine is at rest engages a shoulder 300$^x$, Figs. 6 and 12, of the connecting rod 300, and when the shaft 922 has about completed its movement the rod 300 will be moved with the frame K toward the front of the machine and its shoulder 300$^x$ will engage the stud 704$^a$ on the pawl and disengage the latter from the key stem, and the key will then rise under the influence of its spring 702$^x$.

It is desirable to prevent the machine from being operated when either of the total keys is in a partly depressed position, and to this end there is provided a detent, the same being a lug 137, Fig. 14. There is pivoted to the slotted link 713, a link 912 dotted lines Fig. 10 connected to an arm 913 on a cross shaft 926 carrying also an arm 914, Fig. 14, extending upward at the side of the starting lever 105, and the lug 137 is on this lever and when the starting key is depressed, is in the path of movement of the arm 914. If either the arm 914 or lug 137 is moved slightly out of its normal position, the movement of the other is prevented.

When either total key is fully depressed, the rock shaft 926 rocked from the link 713 Fig. 10 has moved the arm 914 so as not to obstruct the lug 137 and the forward end of the lever 105 can then be depressed. When either of the total keys 702$^R$ or 702$^L$ is depressed, it is necessary to swing the detents 205 out of the paths of the studs 430 so the strips 404 and racks may move under the control of the pinions. This is effected, Fig. 12, by a projection 702$^y$ on each of the total keys, which projections contact with a stud 213$^a$ on a pivoted arm 213, Figs. 3 and 17, the rear end of which, Figs. 12 and 13, contacts with a bell-crank lever 211, one end of which enters a slot in the strip 208, but does not interfere with the usual individual movements of the detents. When a total key is depressed, its projection 702$^y$ depresses the arm 213 which rocks the bell crank lever 211 and moves the strip to the left, thus swinging all the detents out of their normal positions and releasing the strips 404.

To prevent both total and sub-total keys being depressed at the same time, an anchor plate 703 is pivoted between the total key-stems 702$^R$ and 702$^L$, and normally held in a central position by a spring 703$^a$. The plate has two projecting arms 703$^b$ with angular faces.

From the foregoing, it will be seen, referring to Figs. 5, 6, 10 and 11, that the swinging of the lever 710 straightens or bends the toggle and is the means of throwing the racks and pinions into and out of gear, and that in the normal operation of the machines in accumulating, the lever 710 is swung forward by the contact of the shoulder 901ª of the plate 901, to bring the gears into engagement, and on the next action the shoulder 901ᵇ reverses this arrangement. It will further be seen that when the total key 702ᴿ is depressed, depressing the levers 706 and 713, the lever 710 is then operatively connected with the plate 707, and as the plate 707 is rocked by the contact of the parts 952 and 712, the lever 710 swings with its stud 750 following the shoulder 901ᵇ, so that the lever 710 swings forward (when normally it would be at rest) and the gears are engaged at once as the lever 710 begins its movement. The racks are then engaged with the pinions before the strips move forward.

When on the reverse rocking of the shaft 922, the part 952 strikes the part 711, the plate 707 is rocked in the reverse direction and the lever 710 swung back and the gears are disengaged when the wheels are at zero and before the racks move backward.

When the sub-tital key 702ᴸ is depressed and both the levers 705 and 706 carried down, the stud 705ª so tilts the part 711 that it will not be struck by the part 952, and the plate 707 will not be rocked by the contact of these parts, so that the lever 710 will not swing back until the shoulder 901ᵇ strikes the stud 750 on said lever, with the result that the gears remain in engagement during the backward movement of the strips.

From the foregoing it will be seen that the accumulating devices may at different times be independently controlled by two wholly distinct and independent means, which may be independently manipulated to determine the subsequent operations of the machine; first, the means that for accumulating causes the gears to be put into engagement on one movement of the working shaft and out of engagement on the reverse movement; second, the means that to secure a total causes the parts to be so set that the gears will be thrown into and out of connection at different times from that resulting from the first means in accumulating. Further it will be seen that the said accumulating devices may be put under the joint action of both the said means in printing a sub-total. There are therefore devices capable of adjustment by different independent means, one set of devices that only operate in accumulating and another set of devices that only operate in taking a total or sub-total. This distinguishes the machine herein set forth from all others.

The above described machine also differs from all others in that the operations of the parts in printing a total or sub-total are all determined by the positions of distinct and independent devices separately adjusted or set in position before the operation of the machine begins and without any manipulation of the parts during the said operation; that is, causing the machine to print a total or sub-total is secured by the manipulation of parts wholly before commencement of the operation of the machine. The importance of these features is evident in considering the operations when the machine is driven in its operations by a motor at a high speed. Constructions which, in taking a total or sub-total, require manipulation of the parts during the operation of the machine may be effectively employed when the machine is worked by hand and time is afforded to change adjustments at proper intervals during such working, but when the entire working operation is effected in a fraction of a second, as with power driven machines, it is impossible to shift the positions of parts manually at any predetermined moment, and it will be seen that by providing separate and independent devices that may be set before the operations begin and which will then positively and automatically control such operations, I secure the effective taking of totals and sub-totals at the high speed operations of a power driven machine.

The stopping and starting means may be embodied in different forms and used with different control devices for actuating the registering devices whatever be their character whether merely indicators or recorders, and it will be seen that while there is a continuously rotating driving shaft, the working shaft from which the other parts are actuated is rocked only a part revolution after being connected with the driving shaft and is then automatically arrested after effecting a complete action of the parts required to set the registering device. It will further be seen that the temporary connection between the two shafts results from the depression of the starting key only and that therefore any of the number or other keys may be set or reset before any operation on the register results, and that after any number is registered, the connection with the motor ceases automatically. It will further be seen that by providing means to separate the pinions and racks prior to the movements of the racks in either direction, the numbers may be added or subtracted or totalized as required, and that the shifting of the parts to engage or disengage the same may be effected through any suitable means by the operation of the special keys, and that the adjustment of parts to indicate or secure a total or sub-total is effected before the operating parts are put into connection with the motor.

In some cases it is desirable in typewriting or computing machines to vary the force of the printing levers. To effect this, in the present instance, the springs which actuate the hammers are attached to a frame capable of a limited movement in order to permit a variation in tension so that the hammers may strike harder or softer blows as may be required. This frame consists of a cross bar 521 and two arms 506 hung on a cross rod 520 and the springs 580 are connected to the cross bar 521. The frame is raised or lowered to vary the tension by any suitable means as a cam 522, Fig. 8. Any suitable devices for turning the cam to and locking it in desired position may be employed.

While I have referred to the parts for securing a total and sub-total as keys, it will of course be understood that the same results may be secured whether these parts have key heads for being pressed down by the finger, or are otherwise shifted.

Further, it will be understood that the terms "total" and "sub-total" are merely means of designating two totals, meaning that in one case the total is recorded and the machine cleared and in the other that it is recorded and retained in the machine to be carried into subsequent operations.

The patentable features of the improvement in adding and recording machines described in the foregoing specification form the subject matter of the claims of the original application, on which Patent No. 763,692 issued June 28, 1904, and of which this case is a division and therefore are not claimed herein, this application relating mainly to the means whereby to impart movement to the parts of the machine without the exercise of the direct power of the operator and secure an increased rapidity of action.

What is claimed is:—

1. The combination in an adding machine having series of keys and recording devices and intermediate devices for operating the recording devices after the setting of the keys, of a driving shaft, means for putting it into operation upon said intermediate devices, and for automatically and positively arresting the operation after the recording of each amount and always at the same point, substantially as set forth.

2. The combination in an adding machine having series of keys and recording devices and intermediate devices for operating the recording devices to record separate amounts and also totals after the setting of the keys, of a driving shaft, means for putting it into operation upon said devices, and for automatically and positively arresting the operation after the recording of each amount, and at a predetermined point, substantially as set forth.

3. The combination in an adding machine having a plurality of series of keys and recording devices and intermediate devices for operating the recording devices to record separate amounts and also totals and sub-totals, of a driving shaft, means for putting it into operation upon said devices, and for automatically and positively arresting the operation after the recording of each amount and at once on arriving at a predetermined point, substantially as set forth.

4. The combination in an adding machine having keys, recording means, and intermediate devices for actuating said means to record both separate amounts and totals, of a continuously operating driving shaft, and appliances for communicating motion from the driving shaft to said means, and means for positively and mechanically arresting the operation of said appliances after recording each amount and as they reach a predetermined position, substantially as set forth.

5. The combination in an adding machine having a series of recording devices and a series of keys to each recording device, all capable of being set before starting the machine, and means for accumulating and for printing totals and sub-totals, of devices for operating said devices and means, a driving shaft, means for putting it into operative action with said intermediate devices after the setting of the necessary keys, and for mechanically putting it out of action after the recording of each amount and as soon as the intermediate devices reach a predetermined position, substantially as described.

6. The combination with continuously operated power driving means, of an adding machine provided with accumulating devices, devices for indicating items and totals, keys and devices all capable of being actuated while the accumulating devices are at rest to determine the subsequent movements of the accumulating and indicating devices, means for actuating the indicating devices from the accumulating devices, means for connecting the adding machine at will with the driving means to effect the aforesaid subsequent movements by the power of the driving means, and means for automatically disconnecting the machine and driving means after each adding and indicating operation.

7. The combination with the keys, recording means and accumulator wheels of an adding machine, of continuously operated power driving means, a key, means for locking the key in a depressed position while taking a sub-total, connections whereby to determine the operations of the accumulating and recording means to secure the printing of a sub-total and leave the accumulation in the machine, and means for connecting the machine with the driving means after the adjustment of the parts which determine the operation of the accumulating and recording means.

8. In an adding machine the combination of keys, recording means, accumulating devices, devices intermediate the keys and recording and accumulating means whereby to adjust the recording means from the accumulating devices, and devices whereby to record the items to be added and also totals, and means whereby at will to secure the retention of the totals recorded, on the accumulating devices, or to restore the latter to zero, a working shaft forming part of the machine and from which the said devices are operated, a continuously rotating shaft, and means for connecting said latter shaft operatively with the said working shaft to cause the printing of items and totals.

9. In a calculating machine having adding mechanism, keys, and devices controlled by the keys for actuating the adding mechanism, a continuously rotating driving shaft, and means independent of all the keys for putting the actuating devices into action from the driving shaft and for arresting the action automatically at a fixed point on each completed movement of the said devices, substantially as set forth.

10. In an adding machine, the combination of recording and accumulating devices, actuating means therefor, a series of rows of independent keys and connections for determining the extent of action of the recording and accumulating devices, a continuously rotating shaft, in constant frictional engagement with the actuating means, and means for positively arresting the actuating means after each complete action thereof, substantially as set forth.

11. In a calculating machine having adding mechanism, movable keys and means for holding them when depressed, and devices controlled by the keys for actuating the adding mechanism, a continuously rotating driving shaft, means independent of all the keys for communicating the action of the driving shaft to the said actuating devices, means whereby to release any depressed key before the driving shaft puts in action the operating devices, and means for automatically arresting the action of the driving shaft after each amount is recorded, substantially as set forth.

12. In an adding machine, the combination of adding mechanism, a driving shaft, a working shaft, friction devices between the driving and the working shafts to oscillate the latter, means for controlling the motion of the working shaft, and devices controlled by the movement of the working shaft for operating the adding mechanism and for arresting the operation of the working shaft at a predetermined point after each record, substantially as set forth.

13. In an adding machine, the combination of adding wheels, racks for operating them independently, springs for impelling the racks in one direction, a swinging frame for moving them in the opposite direction, a power shaft, a single working shaft, connections between the two shafts for intermittently operating the working shaft, and a cam on the working shaft for controlling the movement of the swinging frame, substantially as set forth.

14. The combination in an adding machine, of a driving shaft, an auxiliary shaft, frictionally driven from the driving shaft, a working shaft connected to be operated from the auxiliary shaft, a detent for arresting the auxiliary shaft at the termination of each rotation, a key and connections for shifting said detent, and means for releasing the detent from the action of the key after the auxiliary shaft begins its rotation, substantially as set forth.

15. In an adding machine, the combination of a driving shaft, a working shaft, friction devices between the driving and the working shafts to oscillate the latter, devices controlled by the movement of the working shaft for operating the adding mechanism, and means for arresting the action of the working shaft after each operation, substantially as set forth.

16. In an adding machine, the combination of a constantly driven shaft, an auxiliary shaft, friction devices for transmitting movement from the driven to the auxiliary shaft, a working shaft, connections between the auxiliary shaft and the working shaft to oscillate the latter when the former is rotated, a latch for engaging a stop on the auxiliary shaft to hold the latter against rotation, means for disengaging the latch from the stop to permit the auxiliary shaft to rotate, and devices controlled by the movement of the working shaft for operating the adding mechanism, substantially as set forth.

17. In a calculating machine, the combination, with the registering means and reciprocating members to operate said registering means, of a constant source of power, a shaft rotated in one direction intermittently thereby, and means between said shaft and members to reciprocate said members.

18. In a calculating machine, the combination, with the registering means and reciprocating members to operate said registering means, of a constant source of power, a shaft rotated in one direction, intermittently, at will thereby, and means upon said shaft to reciprocate said members.

19. In a calculating machine, the combination, with the registering means and reciprocating members to operate said registering means, of a constant source of power, a shaft adapted to be rotated in one direction thereby, means operated from said shaft to reciprocate said members, and means for automatically checking movement of said shaft after each complete rotation.

20. In a calculating machine, the combination, with a series of independently-rotatable figure wheels, a series of independently-reciprocating elements, and a reciprocating member for actuating all of said elements, of a shaft, means imparting a constant force tending to rotate said shaft, means for checking rotation thereof, means for releasing said checking means, means connected with said shaft for reciprocating said member once upon each rotation of said shaft.

21. In a calculating machine, the combination with a shaft, means for imparting a constant force tending to rotate said shaft, means normally checking the rotation thereof at the end of each rotation and for releasing the same, and means for operating said checking means, of a series of normally-checked independently reciprocating elements, means to reciprocate said elements, and means for releasing one or more of said elements and simultaneously limiting its distance of movement in one direction.

22. In a calculating machine, the combination with a constant source of power, of a series of figure wheels, a corresponding series of independently reciprocating members to rotate said wheels, yielding means for shifting said members in one direction, positive means for returning said members, means for automatically engaging the entire series of wheels and said members prior to movement under application of the yielding means and for then disengaging the same, and means for reversing the operation of the disengaging means.

23. In a calculating machine, the combination, with a series of independently-rotatable figure wheels and a corresponding series of independently-reciprocating elements to rotate said wheels, of a shaft normally checked against rotation, means constantly tending to rotate said shaft, a reciprocating member positively operated once upon each rotation of said shaft and common to all of said elements, to communicate movement to said elements, and means for releasing said shaft.

24. In a calculating machine the combination with a series of independently rotatable figure wheels, a series of independently reciprocating elements, and means for engaging and disengaging said wheels and elements, and a reciprocating member for operating all of said elements, of a continuously acting driving means, means for rotating said means, means for checking rotation thereof and for releasing said checking means, and means operated from said rotary means for reciprocating said member once upon each rotation of the rotary means to impart positive movement in one direction to said elements.

25. In a calculating machine, the combination with a shaft, means exerting a constant force tending to rotate the shaft, means for checking the movement of the shaft at the end of each rotation and adjustable to release the same, and means for operating said checking means, of a series of figure wheels, a corresponding series of reciprocating elements, and devices whereby the said wheels and elements may be engaged and disengaged, means interposed between said shaft and said elements to reciprocate the latter once to each complete rotation of the former, and means for automatically disengaging the wheels and elements after the movement of the latter in one direction, and independent means for reversing the operation of the disengaging means.

26. In a calculating machine, the combination with a shaft, means imparting a constant force tending to rotate said shaft, means for arresting the shaft at the end of each rotation and for releasing the same, means for operating said arresting and releasing means, of a series of figure wheels, a corresponding series of reciprocating elements adapted to engage and rotate said wheels, a reciprocating member adapted to actuate said elements, means actuated from said shaft for reciprocating said member once for each complete rotation of the shaft, means for automatically engaging said wheels and elements and for disengaging the same prior to the movement of the latter in one direction, and independent means for reversing the operation of the disengaging means.

27. In a calculating machine, the combination with a shaft, means imparting a constant force tending to rotate said shaft, means for checking the same at the end of each rotation and for releasing the same, of a series of figure wheels, a corresponding series of normally-checked reciprocating elements adapted to engage and rotate said wheels, means interposed between said shaft and elements to secure the reciprocation of the latter once for each complete rotation of the former, means for automatically engaging said wheels and elements prior to the movement of the latter in one direction and for then disengaging the same after the said movement, and independent means for reversing the operation of said disengaging means.

28. In a calculating machine, the combination with a shaft, means imparting a constant force tending to rotate said shaft, means for checking the movement of the shaft at the end of each rotation and means for shifting said checking means, of a series of figure wheels, a corresponding series of normally-checked reciprocating elements adapted to engage and rotate said wheels, a reciprocating member adapted to actuate said elements, means connected with said shaft for reciprocating said member once for each complete rotation of the shaft, means for automatically engaging said wheels and elements and for disengaging the same prior to movement of the latter in one direction, and independent means for reversing the operation of said disengaging means.

29. In a calculating machine, the combination, with a constant source of power, of a series of figure wheels, a corresponding series of normally checked reciprocating members to rotate said wheels, yielding means tending to move all of said members in one direction, means for releasing one or more of said members and simultaneously limiting its extent of movement, positive means for returning the members which have been moved, and means rendering said members inoperative to turn said wheels during movement under application of the yielding forces and means whereby said positive means may be actuated in one direction from said source of power.

30. In a calculating machine, the combination with a constant source of power, of a series of figure wheels, a corresponding series of normally checked, independently reciprocating members one to rotate each wheel, means for simultaneously exerting yielding forces against all of said members in one direction, means for releasing one or more of said members and simultaneously limiting the extent of movement of each, positive means for returning the members which have been moved, and means rendering said members inoperative to turn said wheels during movement under application of yielding force and means whereby said positive means may be actuated in one direction from said source of power.

31. In a calculating machine, the combination, with a constant source of power, of a series of figure wheels, a corresponding series of normally checked reciprocating members to rotate said wheels, yielding means simultaneously tending to move all of said members in one direction, means for releasing and simultaneously limiting the distance of movement of any one or more of said members, means for automatically preventing engagement of the entire series of wheels and said reciprocating members prior to the primary movement, and positive means for returning the members which have been moved and means whereby said positive means may be actuated in one direction from said source of power.

32. The combination in an adding machine, of an operating shaft, a continuously running motor, a working shaft, a crank arm connected with the working shaft, a pitman having one end connected with the crank arm and the other connected with the operating shaft, and clutch mechanism between the motor and the operating shaft whereby the transmission of motion from the motor to the working shaft may be arrested and resumed at the will of the operator.

33. The combination in an adding machine, of an operating shaft, a continuously running motor, a working shaft, a crank arm connected with the working shaft, a pitman connecting said crank arm and the operating shaft, clutch mechanism between the motor and the operating shaft, and a key, and connections whereby to control said clutch mechanism to put the motor into and out of driving operation upon the working shaft.

34. The combination in an adding machine, of an operating shaft, a continuously running motor, a working shaft, a crank arm connected with the working shaft, a pitman having one end connected with the crank arm and the other with the operating shaft, clutch mechanism between the motor and the operating shaft, and a key, and connections whereby to control said clutch mechanism to operatively connect the motor to the working shaft and to arrest said connection.

35. The combination, in an adding machine, of a working rock shaft, a continuously running motor, a clutch operatively connected therewith and with said shaft, means under the control of the operator for controlling the action of the clutch, and means for preventing a second operation of the clutch until the rock shaft has been restored to normal position.

36. In a machine of the character described, the combination with a motor and with the working shaft of the machine, of a clutch device comprising a driving member operated by the motor, a driven member operatively connected with the working shaft of the machine, and means coöperating with the driven member for arresting the rotation thereof and preventing it from being resumed until the working shaft has completed its movements and is in normal position.

37. In a machine of the character described, the combination with a motor and with the working shaft of the machine, of a clutch device comprising a driving member operated by the motor, a driven member operatively connected with the working shaft of the machine, means for arresting the rotation of the driven member and prevent it from being resumed until the working shaft has completed its movements and is in normal position, and a key and connections for shifting said means when the working shaft is in normal position.

38. In a motor-driven adding-machine, in combination, adding and printing mechanism, an actuating rock-shaft therefor, a shiftable total-lever for effecting the printing of the registered total, a motor, drive mechanism actuated by said motor, and connected with the aforesaid rock-shaft, manipulative means for operating said motor-drive, and a guard device whereby said manipulative means is prevented from operative movement when the aforesaid total-lever is improperly displaced, substantially as specified.

39. The combination with a working shaft, of a continuously running motor, a clutch device having driving and driven members connected respectively with the motor and shaft, and a stop device shiftable to arrest and release the driven member and adapted to be automatically returned to its arresting position after the driven member is released and before the driven member has completed a rotation.

40. The combination with a working shaft, of a continuously running motor, a clutch device having driving and driven members connected respectively with the motor and shaft, a pivotally mounted stop device normally arresting rotation of the driven member, and means for shifting said stop to release the driven clutch member, said stop being automatically returned to arresting position before said driven member has completed a rotation.

41. The combination with a working shaft, of a continuously running motor, a clutch device having driving and driven members connected respectively with the motor and shaft, a stop device for arresting rotation of the driven member of the clutch, a starting device or key adapted to shift the stop to release the driven member of the clutch, said stop being automatically returned to arresting position before said driven member has completed a rotation, and means for preventing said key from again shifting the stop until the working shaft has resumed its normal stop position.

42. The combination with the driving shaft, driven shaft, and intermediate clutch device having driving and driven members, of a stop device for arresting the driven member, a starting device or key for shifting the stop device out of stop position, said stop being automatically returned to position to arrest the driven member before the latter has completed a rotation, and means for operatively disconnecting the key and stop device until the key is restored to starting position.

43. The combination with the driving shaft, driven shaft, and intermediate clutch device having driving and driven members, of a stop device for arresting the driven member, a starting device or key for shifting the stop device out of stop position, and means for releasing the stop device to permit it to return to stop position before the driven clutch member has completed a rotation.

44. The combination with a working shaft, of a motor, a clutch having its driving member connected with the motor and its driven member connected with the working shaft, a stop for arresting movement of the driven member of the clutch, key actuated means for shifting the stop from stop position when the working shaft is at rest, and means adapted to render the key actuated means inoperative on the commencement of each actuation of the working shaft and to maintain the parts in such condition throughout the movement of said shaft.

45. The combination with a working shaft, of a motor, a clutch having its driving member connected with the motor and its driven member connected with the working shaft, a swinging stop for arresting movement of the driven member of the clutch, a starting key, means adapted to be actuated by said key to swing said stop from operative position, and means for automatically disengaging said key actuated means and stop as the rotation of the driven clutch member begins.

46. The combination with a working shaft, of a motor, a clutch having its driving member connected with the motor and its driven member connected with the working shaft, a stop for arresting movement of the driven clutch member, a starting key, a blade pivotally connected with and adapted to be reciprocated by the key to move the stop from operative position, and means operated by the rotation of the driven clutch member for rocking the blade on its pivot to disengage it from the stop.

47. The combination with a working shaft, of a motor, a clutch having its driving and driven members connected respectively with the motor and working shaft, and a single detent adapted to normally arrest rotation of the driven clutch member and also to positively control and limit rotation of said clutch member.

In testimony whereof I have signed my name to this specification in the presence of two subscribing witnesses.

WILLIAM H. PIKE, Jr.

Witnesses:
E. G. LANGHORNE,
E. C. BATAILLE.